Jan. 27, 1959     E. J. DVORAK     2,870,530
FAUCET HANDLE PULLER
Filed May 7, 1956
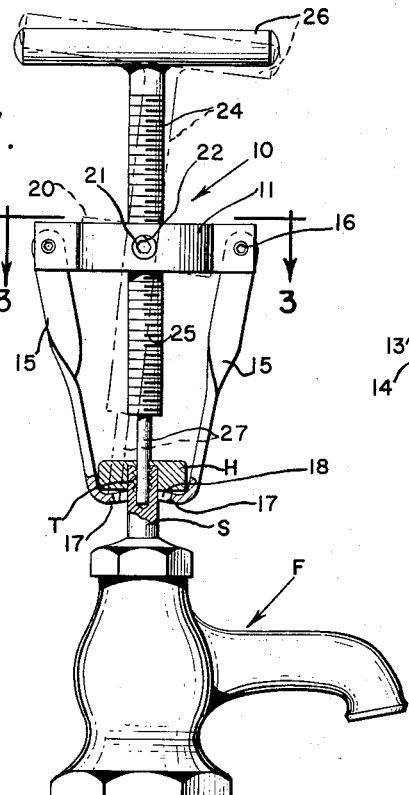
Fig. 1.
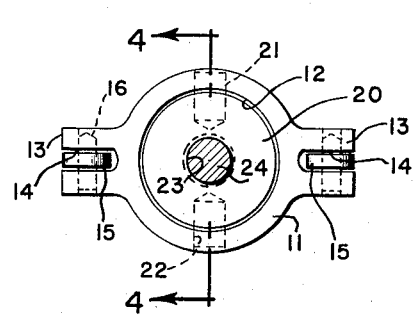
Fig. 3.
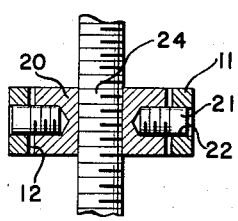
Fig. 4.
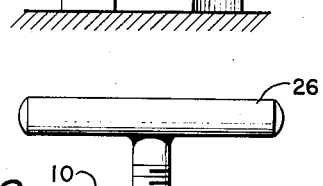
Fig. 2.
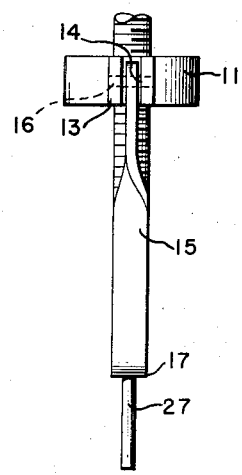
Ervin J. Dvorak,
INVENTOR.
BY
AGENT

United States Patent Office 2,870,530
Patented Jan. 27, 1959

2,870,530

FAUCET HANDLE PULLER

Ervin J. Dvorak, Azusa, Calif.

Application May 7, 1956, Serial No. 583,298

1 Claim. (Cl. 29—261)

This invention relates to a faucet handle puller and relates more particularly to a tool that is adapted for placement in association with the handle of water faucets or the like for removing the faucet handle from a valve stem.

In many instances, after handles have been installed and used for a long period of time, the removal thereof is not only extremely difficult but has heretofore required the use of various tools that tend to mar the metallic suface, and/or cause breakage thereof. Corrosive effects of the material in water causes faucet handles to seal on to splines usually associated with an upper exposed end of a faucet valve stem.

It is accordingly one important object of the invention to provide a faucet handle puller that may be easily, rapidly and efficiently utilized to remove a faucet handle from a faucet valve stem.

It is another object of the invention to provide a faucet handle puller as characterized herein and wherein faucet handles may be removed without damage thereto.

It is a further object of the invention to provide a faucet handle puller that is relatively simple in construction, reliable in operation and which may be manufactured at a minimum cost.

Still another object of the invention is to provide a faucet handle puller having means to compensate for any misalignment between the faucet handle and the valve stem on which it is secured.

Other and further important objects of the invention will become apparent from disclosures in the following detailed specification, appended claim and accompanying drawings, wherein:

Figure 1 is a side elevational view of the present faucet handle puller shown in association with a faucet handle;

Fig. 2 is a front elevational view of the faucet handle puller;

Fig. 3 is an enlarged fragmentary sectional view of the alignment correction means, as taken substantially as indicated by line 3—3, Fig. 1; and Fig. 4 is an enlarged fragmentary sectional view taken substantially as indicated on line 4—4, Fig. 3.

With reference to the drawing, the puller of the present invention is shown as indicated generally at 10 and associated with a faucet F, having a valve stem S and a handle H. Faucet handles are generally secured on splines on the upper end of the valve stem and retained thereon by means of a screw that is disposed in threads indicated at T in the upper free end of the valve stem S.

The puller 10 includes a body 11 that is generally annular, having a circular opening 12 therein. A pair of bifurcated lugs 13 are integrally disposed laterally from the body 11, the slots 14 therein being adapted for reception of upper ends of the puller arms 15. The puller arms 15 are pivotally mounted on pivot pins 16 that extend through the lugs 13.

The puller arms 15 are bent 90° and have lower ends 17 disposed in a converging manner and having semi-circular notches 18. The notches 18 are adapted for reception of the valve stem S with the lower ends 17 being adapted for disposition beneath the handle H.

The opening 12 in the body 11 is adapted for spaced reception of an annular gimbal nut 20. The nut 20 has a pair of supporting shafts 21 disposed from lateral sides thereof and on axes substantially normal to the positions of the bifurcated lugs 13. The outer ends of the shafts 21 are adapted for pivotal reception in bores 22 through the body 11. The nut 20 has a centrally disposed threaded opening 23 therein that is adapted for threadable reception of a stem engaging T-shaped member 24 that is elongated and provided with threads 25 along the surface thereof and a cross handle portion 26 integrally at the upper end thereof. The lower end of the member 24 has an integral axially disposed pin portion 27 that is adapted for disposition in the opening in the upper end of the stem S that is normally occupied by the handle retaining screw disposed in the threads T.

It may be seen that the disposition of the member 24 in the threaded opening 23 in the gimbal nut 20 serves to permit lateral displacement of the pin portion 27 as necessary to enable proper alignment with the stem S. The member 24, together with the nut 20, are movable in accordance with the position indicated by the dotted lines in Fig. 1. The peripheral portion of the gimbal nut is positioned in close proximity to the bore whereby to limit pivotal movement of the nut.

In operation, the nuts 17 of the arms 15 are positioned as shown in Fig. 1, beneath the handle H and about the stem S. Thereafter, the member 24 is threaded downwardly through the threaded opening 23 in the gimbal nut 20 until the lower end of the pin 27 engages the bottom of the threaded opening in the upper end of the stem S. Thereafter, any misalignment between the various components is compensated for by means of the beforementioned lateral displacement facility of the pin 27 and the member 24 and further threading of the member 24 through the opening 23 serves to move the body 11 and the arms 15 in an upwardly direction with respect to the stem S whereby to remove the handle from the stem. Inasmuch as the lower end 17 of the arms 15 engage an inner lower surface of the handle H, no marring or other damage to the handle H will be experienced during the removal thereof from the stem S.

Furthermore, it is to be noted that the various components of the present device are relatively simple, may be easily assembled and accordingly may be inexpensively manufactured.

Having thus described the invention and the present embodiment thereof, it is desired to emphasize the fact that many modifications may be resorted to in a manner limited only by a just interpretation of the following claim.

I claim:

A faucet handle puller comprising, in combination: a generally annular body member having a cylindrical bore therein; a pair of arms having right angle twists and pivotally depended from bifurcated lugs depended integrally laterally from an outer peripheral portion of said body member; end faucet handle engaging portions formed integrally on free ends of said arms; semicircular faucet stem engaging cutouts in said engaging portions; an annular gimbal nut disposed in said bore and pivotally connected with said body member, an axis of said pivotal connection between said nut and said body member being substantially normal to a plane interconnecting the pivotal connection of said arms to said body member, a peripheral portion of said nut being positioned in close proximity to said bore in said body member whereby to limit pivotal movement of said nut about said pivotal connection thereof with said body member; a faucet stem engaging member threadably disposed through a central area of said nut; a handle formed integrally on one end of said engaging member; an elongated reduced diameter pin portion formed integrally on another end of said engaging member; and a transverse end on said pin portion, said pin portion and said end thereof being adapted for disposition in a threaded bore in a free end of said faucet stem, whereby to engage a bottom of said threaded bore and upon threadable travel of said engaging member through said nut to move said pin portion relative to said engaging portions of said arms to separate said faucet handle from said faucet stem.

References Cited in the file of this patent

UNITED STATES PATENTS

| | | |
|---|---|---|
| 864,981 | McCarthy | Sept. 3, 1907 |
| 1,131,868 | Ridlon | Mar. 16, 1915 |
| 1,700,051 | Hinote | Jan. 22, 1929 |